Patented June 11, 1935

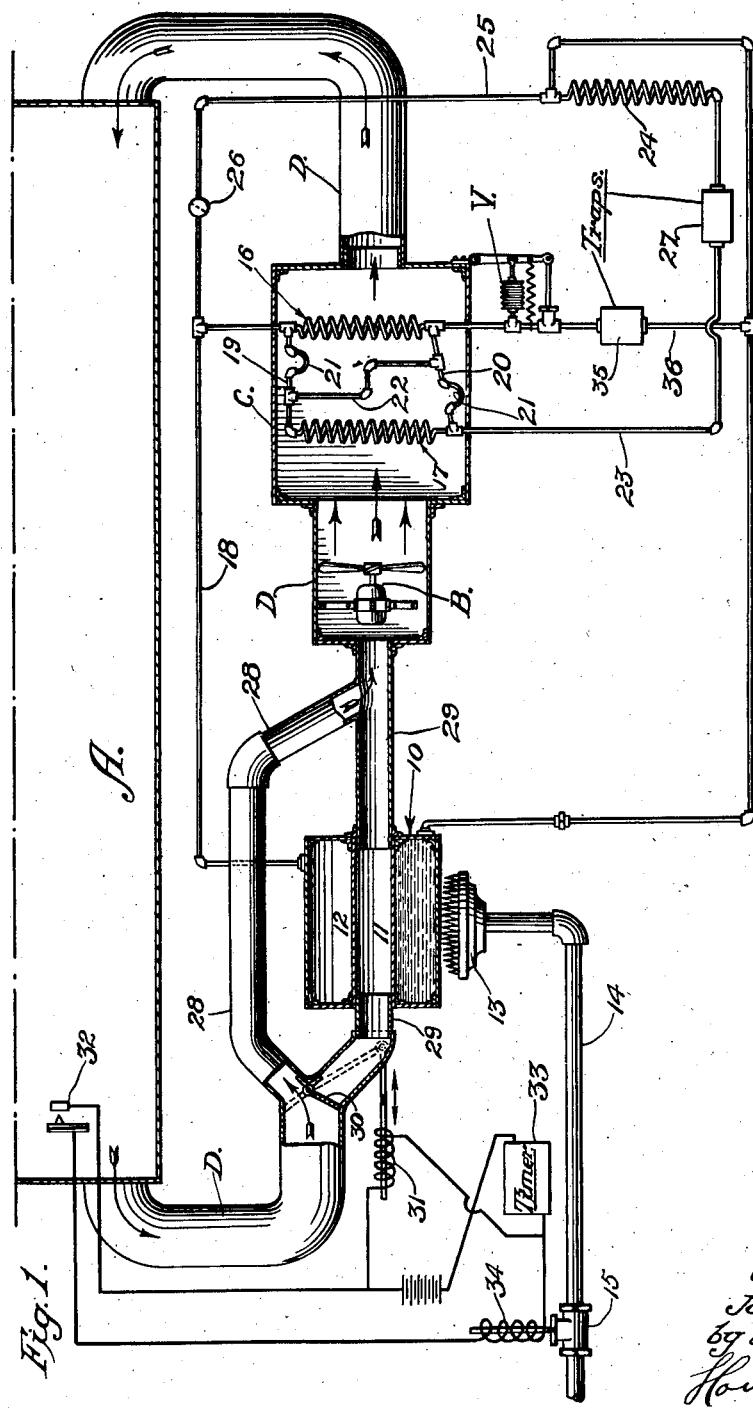

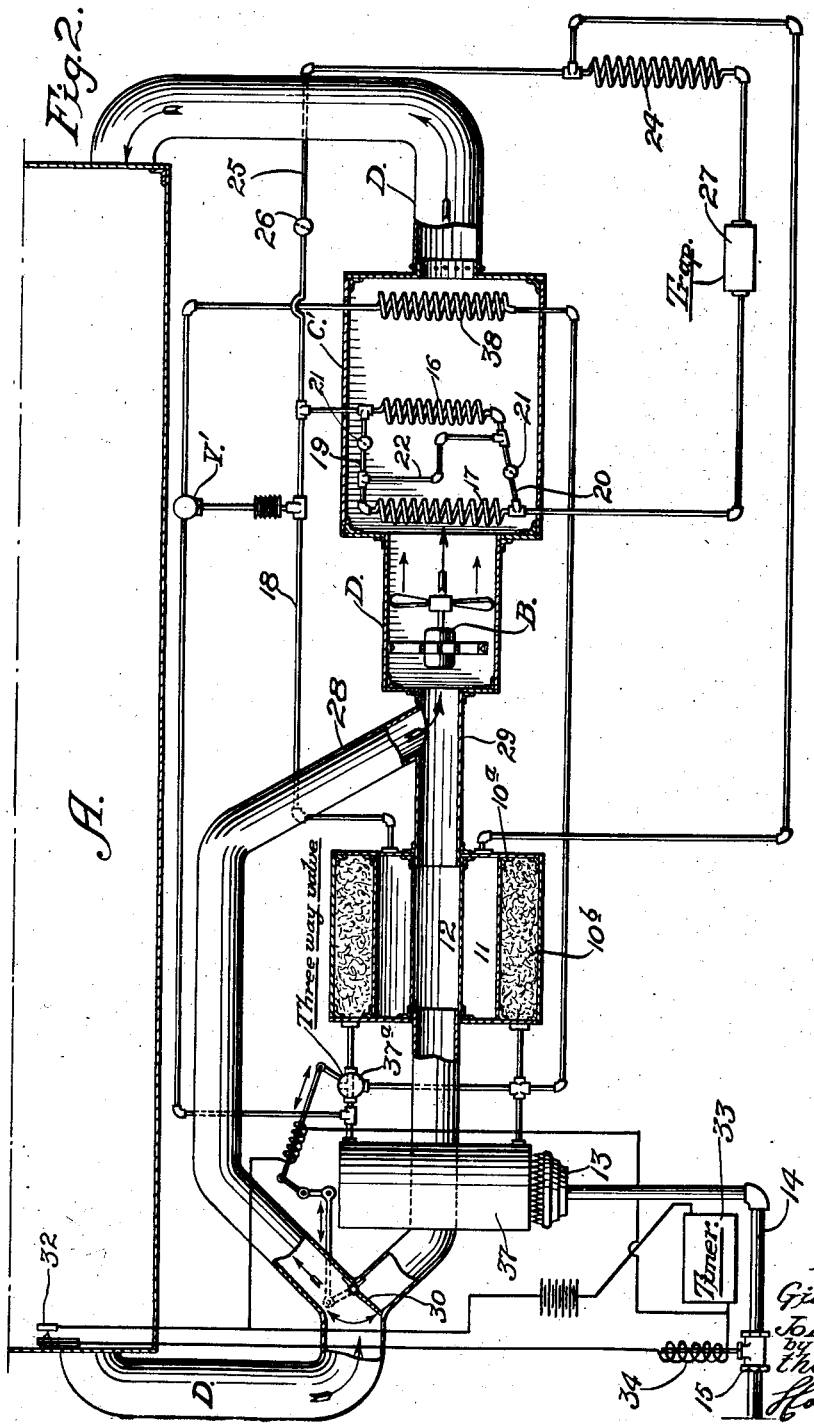

2,004,843

UNITED STATES PATENT OFFICE 2,004,843

ABSORPTION CYCLE TEMPERATURE CONTROL APPARATUS

Gilbert Wilkes, Jacksonwald, and John S. Avery, Pennside, Pa., assignors to Wilkes Avery Corporation, New York, N. Y., a corporation of New York Application August 4, 1932, Serial No. 627,500

12 Claims. (Cl. 62—118)

This invention relates to absorption cycle temperature control apparatus, and more particularly to an absorption cycle heat pump apparatus for use in heating a given area.

An important object of the present invention is the provision in an apparatus of this character of an arrangement such that an auxiliary heater is automatically brought into play during peak heating demands.

A further object of the invention is the arrangement of an absorption cycle heat pump in use in heating a given area so that the heating means of the generator-absorber may be caused to supply auxiliary heat during peak loads on the apparatus.

A still further object of the invention is the provision of an arrangement such that a portion of the condenser of the heat pump cycle may act as the auxiliary heater during peak loads and may be controlled by the vaporization of the absorption liquid of the cycle resulting during peak loads.

A further object of the invention is the provision in an arrangement of this character, in which the generator-absorber is heated indirectly by a heating means, of apparatus whereby an auxiliary heater arrangement in the heat pump cycle is automatically connected with the heater of the generator-absorber during peak loads.

These and other objects we attain by the construction shown in the accompanying drawings wherein, for the purpose of illustration we have shown a preferred embodiment of our invention and wherein:

Fig. 1 is a diagrammatic view of a heat pump cycle controlling the heating of a given area embodying auxiliary heating means in accordance with our invention; and Fig. 2 is a diagram of a modified construction.

Referring now to the drawings, and more particularly to Fig. 1 thereof, the numeral 10 generally designates the generator-absorber of an absorption cycle heat pump at present illustratively shown as comprising a drum having a central passage 11 therethrough defining an annular chamber 12 for the reception of an absorption fluid and a contained refrigerant such as ammonia. It will, of course, be understood that the illustration herein provided is entirely diagrammatic and that the generator-absorber may be equipped with the usual refinements to promote the efficiency thereof. The annular chamber 10 is heated through suitable heating means at present indicated as a gas burner 13 receiving its supply through a conduit 14 including an electrically controlled valve 15. The cycle further includes a condenser C comprising a main section 16 and a secondary section 17, of which the main section 16 is connected at its upper end with the outlet of chamber 12 through a conduit 18 and at its upper and lower ends with the secondary section 17 through conduits 19 and 20, each containing a liquid seal 21 or the like. The lower end of the section 16 is connected with the upper end of the section 17 through a conduit 22, this conduit communicating with the conduit 20 between the seal 21 thereof and the lower end of section 16 and with the conduit 19 between the seal 21 thereof and the outer end of section 17 so that there is normally a flow of refrigerant from the sections 16 through the conduit 22 and through section 17. The lower end of section 17 is in communication, through a conduit 23, with an evaporator 24 which is connected to the conduit 18 by a conduit 25 containing a check valve 26 opening toward the generator-absorber 10. Conduit 23 preferably includes means, as a trap, indicated at 27 which will permit passage of liquids to evaporator 24 while preventing the passage of gases thereto.

The above described construction comprises substantially the ordinary absorption cycle heat pump with the addition thereto of a condenser coil of the type illustrated in the prior application of Gilbert Wilkes, filed December 24, 1931, Serial #583,125 for house temperature controlling apparatus. In adapting such cycle to heating of an area A the condenser is disposed in a casing C forming a portion of the duct D having arranged therein a suitable blower B and connected with the area A at its opposite end. The intake end of the duct is branched as indicated at 28 and 29, the branch 29 forming a by-pass extending through the central opening 11 of the generator-absorber 10. Passage of air through the branch 28 or 29 is controlled by a damper 30 under electrical control including a coil 31. Within the area A a thermostat 32 is arranged, this thermostat including a timing mechanism 33 and an operating coil 34 for valve 15. Coil 31 shunts the coil 34 and thermostat 32 in the circuit with the result that, at each closure of the circuit by the timing mechanism, coil 31 is operated shifting damper 30 to a position where it diverts flow from the channel 29 of duct D to the channel 28 thereof. If at the time of closure of the circuit by timer 33 the thermostat 32 is closed, coil 34 is actuated opening valve 15 and supplying the burner 13, with the result that the chamber 12 is heated.

Thus, in normal operation during supply of gas to the burner 13 air is drawn through the channel 28 of duct D and forced through the condenser to be heated thereby as it passes through the casing C and the outlet branch of duct D to the area A. When the timing mechanism opens the circuit, the flow of air is through the channel 29 of duct D with the result that this air is heated and serves to cool the chamber 12. At this time, of course, the condenser is going out of operation so that the absorbent contained in the chamber 12 constitutes the main heating means for the air, particularly toward the close of the "off" cycle.

It will be understood that at certain times, as in extremely cold weather, the heat pump may prove insufficient to heat the area A to the desired temperature, in which event the thermostat 32 would remain closed and heating of the generator-absorber would be continuous through all closed periods. In this event, the "off" period cycle of operation of the timing mechanism will prove insufficient to permit cooling of the absorption liquid to an extent providing re-absorption, which condition continuing will result in absorption liquid being driven off from the generator-absorber and passing to the section 16 of the condenser. Under such circumstances, we provide means, as a pressure-controlled valve V whereby the increased pressure or increased temperature in section 16 is caused to place the lower end of this section in communication through a trap 35 and conduit 36 with the intake of chamber 12. Generator-absorber 10, section 16 of the condenser and the connections 18 and 36 now provide a direct gas-fired heating system of which the condenser section 16 comprises a radiator arranged in the duct so that the additional heat necessary to supply the demands of area A will be supplied.

Operation of this gas-fired heating system will not interfere with the operation of the heat pump cycle which will continue to deliver condensed refrigerant to the evaporator 24 where it will absorb heat and, in "off" periods of the generator-absorber, return the same to the absorber 10. In disposing the sections 17 and 16 of the condenser in the casing C it is important that the section 17 be arranged in advance as regards the proximity to the incoming air supply, which section in normal operation is the less highly heated, circulation of the refrigerating medium through the condenser being through section 16, conduit 22 and section 17. Therefore, such disposition of the sections will result in the section 17 being attacked by the cooler air while containing the cooler refrigerant resulting in more rapid condensation.

In Fig. 2 we have illustrated a modification of this arrangement wherein the generator-absorber 10—a instead of being directly heated, is steam or water heated by a separate heating plant shown as in the form of a gas-fired boiler 37, intermittently connected with a chamber 10—b of the generator-absorber 10—a by means of a timing device 33 controlling the damper 30 and a three-way valve 37—a. In this form of the invention an auxiliary heater 38 is placed in the casing C' and connected in parallel with the generator-absorber 10—a. The valve V' controlled by pressure or temperature in the generator-absorber 10—a of the condenser is placed to interrupt circulation through the auxiliary heater 38. When, for any reason, the heat demand of area A exceeds the available supply of the heat pump, excessive heat or pressure will cause valve V' to open, placing the heater 38 in circulation to augment the heating action of the heat pump. The heat pump cycle, with the exception of the omission of the connection 36, and the air circulating system may be identical with the system above described, as may be the controls for the gas valve 15 supplying the burner 13 of the boiler 37. It will be noted that in each instance, the heating means for operation of the generator-absorber acts to supply auxiliary heat in event of excessive demands. Obviously, by employing a valve system such as that shown in the prior application above identified the heat pump may be made reversible to enable the area A to be cooled.

It is to be understood that the controls illustrated for providing intermittent operation of the generator-absorber and for controlling the damper are capable of considerable modification without in any manner departing from the spirit of the invention; we do not, therefore, wish to be limited to the particular construction shown except as hereinafter claimed.

We claim:

1. In apparatus for heating and in combination with an area to be heated, an absorption cycle heat pump comprising a generator-absorber, a condenser and an evaporator arranged in series, a casing duct-connected with said area for the circulation of a fluid, and means for causing circulation of the fluid, said condenser being disposed in said casing, the duct connections between said casing and said area comprising parallel duct branches with one of which said generator-absorber is in heat transfer relation.

2. In apparatus for heating and in combination with an area to be heated, an absorption cycle heat pump comprising a generator-absorber, a condenser and an evaporator arranged in series, a casing duct-connected with said area for the circulation of a fluid, means for causing circulation of the fluid, said condenser being disposed in said casing, the duct connections between said casing and said area comprising parallel duct branches with one of which said generator-absorber is in heat transfer relation, means for alternately directing the circulated fluid through said duct branches and means for heating said generator-absorber when the flow of fluid is through the duct branch not in heat transfer relation to said generator-absorber.

3. In apparatus for heating and in combination with an area to be heated, an absorption cycle heat pump comprising a generator-absorber, a condenser and an evaporator arranged in series, said condenser being in heat transfer relation to said area, heating means for said generator-absorber whereby the refrigerant contained in the carrier liquid in the generator-absorber is caused to circulate through said condenser and evaporator and means for causing circulation of the carrier liquid through a portion of said condenser operating in response to heat demands by said area in excess of that produceable by said heat pump.

4. In apparatus for heating and in combination with an area to be heated, an absorption cycle heat pump comprising a generator-absorber, a condenser and an evaporator arranged in series, a casing duct-connected with said area for the circulation of a fluid, means for causing circulation of the fluid, said condenser being disposed in said casing, said generator absorber being in heat transfer relation to said duct, a heat transfer coil in said casing, and means responsive to heat demands by said area in excess of those deliverable by said heat pump for circulating a fluid heating medium through said heat transfer coil.

5. In apparatus for heating and in combination with an area to be heated, an absorption cycle heat pump comprising a generator-absorber, a condenser and an evaporator arranged in series, a casing duct-connected with said area for the circulation of a fluid, means for causing circulation of the fluid, said condenser being disposed in said casing, the duct connections between said casing and said area comprising parallel duct branches with one of which said generator-absorber is in heat transfer relation, a heat transfer coil in said casing, and means responsive to heat demands by said area in excess of those deliverable by said heat pump for circulating a fluid heating medium through said heat transfer coil.

6. In apparatus for heating and in combination with an area to be heated, an absorption cycle heat pump comprising a generator-absorber, a condenser and an evaporator arranged in series, a casing duct-connected with said area for the circulation of a fluid, means for causing circulation of the fluid, said condenser being disposed in said casing, the duct connections between said casing and said area comprising parallel duct branches with one of which said generator-absorber is in heat transfer relation, means for alternately directing the circulating fluid through said duct branches, means for heating said generator-absorber when the flow of fluid is through the duct branch not in heat transfer relation to said generator-absorber, a heat transfer coil in said casing, and means responsive to heat demands by said area in excess of those deliverable by said heat pump for circulating a fluid heating medium through said heat transfer coil.

7. In apparatus for heating, and in combination with an area to be heated, means for heating a liquid, a gas circulated by heating of said liquid, a circulation system for said gas comprising a condenser in heat-transfer relation to said area and an evaporator isolated from the area, and means for placing the liquid in heat-transfer relation to said area responsive to heat demands by the area in excess of that produceable by circulation of the gas.

8. In apparatus for heating, and in combination with an area to be heated, means for heating a liquid, a gas circulated by heating of said liquid, a circulation system for said gas comprising a condenser in heat-transfer relation to said area and an evaporator isolated from the area, and means for placing the liquid in heat-transfer relation to said area responsive to heat demands by the area in excess of that produceable by circulation of the gas, said liquid comprising an absorption medium for the gas.

9. In apparatus for heating, and in combination with an area to be heated, an absorption cycle heat pump comprising a generator-absorber, a condenser and evaporator arranged in series, a casing duct-connected with said area for the circulation of a fluid, means for causing circulation of the fluid, said condenser being disposed in said casing and means controlled by excessive heat demands on said heat pump for establishing circulation of the absorption liquid of the generator-absorber through said condenser.

10. In apparatus for heating air to be circulated in an area, an absorption cycle heat pump comprising generator and absorber means, a condenser and an evaporator arranged in series, said absorber and condenser being in heat transfer relation to the air, a heating medium for said generator normally out of heat transfer relation with said air, and means responsive to heat demand in excess of that producible by said absorber and condenser for placing the generator heating medium in direct heat transfer relation to said air while maintaining normal relation of said medium with said generator.

11. In apparatus for heating, the combination with an area to be heated, means to circulate air to said area, an absorption cycle heat pump comprising generator and absorber means, a condenser and an evaporator arranged in series, said absorber and condenser being in heat transfer relation with the air stream, said condenser having a high and low temperature zone in counterflow relation to said air stream, said high temperature zone serving normally as a super heat zone in which refrigerant super heat is removed, and said low temperature zone serving to remove the heat of vaporization of the refrigerant, and means responsive to extreme heat demands for returning excess absorbent vapor directly to the absorber from said high temperature zone.

12. In apparatus for heating, the combination with an area to be heated, means to circulate air to said area, an absorption cycle heat pump comprising generator and absorber means, a condenser and an evaporator arranged in series, said absorber and condenser being in heat transfer relation with the air stream, a heating unit disposed after said condenser in the air stream and receiving heat from the same source as the generator in response to heat demands in excess of the capacity of the heat pump.

GILBERT WILKES.
JOHN S. AVERY.